United States Patent
Kitani et al.

(10) Patent No.: US 12,109,766 B2
(45) Date of Patent: Oct. 8, 2024

(54) FIBER-REINFORCED COMPOSITE MOLDED ARTICLE AND METHOD FOR MOLDING SAME

(71) Applicant: Toray Industries, Inc., Tokyo (JP)

(72) Inventors: Chiasa Kitani, Nagoya (JP); Satoshi Matsumoto, Nagoya (JP); Shigeru Kawashima, Nagoya (JP); Atsuki Tsuchiya, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 164 days.

(21) Appl. No.: 17/796,730

(22) PCT Filed: Feb. 21, 2020

(86) PCT No.: PCT/JP2020/007190
§ 371 (c)(1),
(2) Date: Aug. 1, 2022

(87) PCT Pub. No.: WO2021/166241
PCT Pub. Date: Aug. 26, 2021

(65) Prior Publication Data
US 2023/0067964 A1 Mar. 2, 2023

(51) Int. Cl.
*B29C 70/48* (2006.01)
*B29C 33/64* (2006.01)
(Continued)

(52) U.S. Cl.
CPC .............. *B29C 70/48* (2013.01); *B29C 33/64* (2013.01); *B29K 2101/10* (2013.01); *B29K 2307/04* (2013.01)

(58) Field of Classification Search
CPC ................................. B29C 70/48; B29C 33/64
(Continued)

(56) References Cited

U.S. PATENT DOCUMENTS

| | | |
|---|---|---|
| 2012/0237751 A1 | 9/2012 | Kotake et al. |
| 2012/0247820 A1 | 10/2012 | Miyatake et al. |
| 2014/0349113 A1* | 11/2014 | Saito ............... C08L 77/06 528/335 |

FOREIGN PATENT DOCUMENTS

| | | |
|---|---|---|
| JP | 2010066323 A | 3/2010 |
| JP | 2010274612 A | 12/2010 |

(Continued)

OTHER PUBLICATIONS

Machine_English_translation_WO_2019188020_A1; Kawashima et. al.; Internal Mold Release Agent for Fiber-Reinforced Composite Material; Oct. 3, 2019; EPO; whole document (Year: 2024).*

(Continued)

*Primary Examiner* — Tahseen Khan
(74) *Attorney, Agent, or Firm* — Buchanan Ingersoll & Rooney PC (57) ABSTRACT

Provided are a fiber-reinforced composite molded article prepared by heat-curing, as a molding material of a fiber-reinforced resin material, a resin composition to which an internal mold release agent is added, the fiber-reinforced composite molded article being capable of effectively producing mold releasability even with a small amount of the mold release agent added, and being capable of achieving high productivity, and a method of forming the fiber-reinforced composite molded article. A fiber-reinforced composite molded article prepared by curing reinforcing (Continued)

fibers and a resin composition, the resin composition including an internal mold release agent, wherein the value obtained by normalizing a Poisson-corrected ion intensity derived from the internal mold release agent detected on the surface of the fiber-reinforced composite molded article, by the Poisson-corrected gross positive secondary ion intensity detected in the predetermined area is higher than 0.1, and a molding method therefor.

8 Claims, 3 Drawing Sheets

(51) Int. Cl.
*B29K 101/10* (2006.01)
*B29K 307/04* (2006.01)

(58) Field of Classification Search
USPC .......................................................... 428/220
See application file for complete search history.

(56) References Cited

FOREIGN PATENT DOCUMENTS

| | | |
|---|---|---|
| JP | 2011089071 A | 5/2011 |
| JP | 2015151457 A | 8/2015 |
| JP | 2016060870 A | 4/2016 |
| JP | 2016094611 A | 5/2016 |
| JP | 2017203107 A | 11/2017 |
| WO | 2017191771 A1 | 11/2017 |
| WO | WO-2019188020 A1 * | 10/2019 |

OTHER PUBLICATIONS

Shin-Etsu; Modified Silicone Fluid for REsin Modification; 2018, whole document (Year: 2024).*
International Search Report and Written Opinion for International Application No. PCT/JP2020/007190, dated Apr. 14, 2020, 8 pages.

* cited by examiner

ic molded articles. Patent Document 5 does not describe mold releasability either.

FIBER-REINFORCED COMPOSITE MOLDED ARTICLE AND METHOD FOR MOLDING SAME

CROSS REFERENCE TO RELATED APPLICATIONS

This application is the U.S. National Phase application of PCT/JP2020/007190, filed Feb. 21, 2020, the disclosure of this application being incorporated herein by reference in its entirety for all purposes.

FIELD OF THE INVENTION

The present invention relates to a fiber-reinforced composite molded article using a mold release agent for fiber-reinforced composite materials, and a molding method therefor.

BACKGROUND OF THE INVENTION

Due to their high strength and high stiffness, fiber-reinforced resin materials are used in a wide range of fields such as the aircraft field, automotive field, and sport and leisure industries. Such fiber-reinforced resin materials are formed by various molding methods such as resin transfer molding, autoclave molding, pultrusion molding, compression molding, injection molding, and filament winding molding, depending on their uses and shapes. In cases where these molding methods are selected, a mold release agent is commonly used since the molded article needs to be demolded from the mold after the molding.

For example, in Patent Document 1, a mold release agent (external mold release agent) is applied (or sprayed) to the mold to form a thin film of the mold release agent on the mold surface, to secure mold releasability for the molded article. On the other hand, as in Patent Document 2, a method in which a mold release agent (internal mold release agent) is preliminarily added to a resin composition comprising a thermosetting resin, to allow bleed out of the mold release agent component on the molded article surface during curing of the resin in the mold, to thereby produce mold releasability, has also been employed.

Further, as in Patent Document 3, there is a technique based on addition of a liquid silicone, for providing a liquid epoxy resin composition that enhances mold releasability and providing a liquid epoxy resin molding material having excellent continuous moldability. Further, as in Patent Document 4, there is a case suggesting that a fiber-reinforced composite material capable of producing excellent mold releasability can be provided using a fluorine-based mold release agent.

Further, in Patent Document 5, by controlling the monomer ratio on the surface of a photosensitive resin layer using TOF-SIMS, detachability and adhesiveness to a cover film could be appropriately controlled.

PATENT DOCUMENTS

[Patent Document 1] JP 2010-274612 A
[Patent Document 2] JP 2011-89071 A
[Patent Document 3] JP 2015-151457 A
[Patent Document 4] JP 2017-203107 A
[Patent Document 5] JP 2010-66323 A

SUMMARY OF THE INVENTION

However, in a molding method using an external mold release agent as described in Patent Document 1, mold releasability from the mold surface decreases as the molding is repeatedly carried out, so that the mold release agent needs to be frequently applied (or sprayed) to the mold surface. This increases the cost and labor for the molding. In particular, in cases where the resin is an epoxy resin, the resin may remain as burrs on the mold surface after the molding since the resin is highly adhesive to metals. As a result, time and cost are required for removal of the burrs, and the quality of the molded article surface may be deteriorated.

Further, in a method in which an internal mold release agent is added into a resin composition as described in Patent Document 2, a mold release agent in an amount of as much as up to ten and several parts by mass needs to be added per 100 parts by mass of the total epoxy resin in order to secure sufficient mold releasability, depending on the mold release agent. In cases where such an amount of internal mold release agent is added, the mold releasability upon the molding may be sufficient, but the mold release agent layer formed on the surface of the molded article becomes thick. Therefore, in a step of adhering the formed molded article to another component (made of a metal or fiber-reinforced resin), or in a coating step or later steps, the mold release agent layer may cause detachment at the joining section or coated section. Thus, the mold release agent layer needs to be sufficiently removed by a pretreatment step such as sanding, but, as the thickness of the mold release agent layer increases, more time and cost are required in this step. Moreover, in cases where the amount of the mold release agent added is large, mechanical properties of the molded fiber-reinforced resin component may be deteriorated.

Thus, the internal mold release agent needs to be added in the least amount while allowing mold release. As described in Patent Document 2, a variety of mold release agents have been proposed as candidates depending on the resins employed, but the amounts in which these mold release agents are to be added have not been sufficiently studied.

The polyether/epoxy-modified liquid silicone used in Patent Document 3 does not have a sufficient mold releasability-producing effect on epoxy resins. Therefore, in cases of molding for industrial application in which thin and complex shapes are basically demanded, the liquid silicone hardly enables production of a molded article when it is added in a small amount without using an external mold release agent.

The mold release agent used in Patent Document 4 is said to have a melting point or softening point of 25° C. to 100° C. from the viewpoint of decreasing the bleeding property in materials requiring low-temperature storage, such as prepregs and sheet molding compound materials. In cases where such a mold release agent that solidifies at normal temperature is used, a step of polishing and degreasing is indispensable before the steps of coating and adhesion after the molding, which are often carried out in an environment at normal temperature. Further, in cases where the mold release agent becomes solid in the fiber-reinforced material, hardness of the material itself may increase, leading to deterioration of handling properties, and deterioration of mechanical properties after the molding. Further, although it is described that frequent application of an external mold release agent is unnecessary, no material that can be molded without application of an external mold release agent has been provided since there is no index indicating a good status of mold releasability.

Patent Document 5 is based on the adhesiveness of the photosensitive resin layer to the film, and therefore it is difficult to apply the technique to fiber-reinforced composmolded articles that can be formed without using an external mold release agent. Further, irrespective of the fact that the ratio of the monomer secondary ion intensity to the total secondary ion intensity obtained by TOF-SIMS analysis is low, the amount of the monomers with respect to the entire solid is large, so that the technique does not allow production of mold releasability by addition of a small amount of the monomers.

The present invention was made in view of the problems described above, and an object of the present invention is to provide a fiber-reinforced composite molded article containing, as a molding material of a fiber-reinforced resin material, a resin composition to which an internal mold release agent is added, the resin composition being capable of effectively producing, even with a small amount of the mold release agent added, mold releasability without use of an external mold release agent, and being capable of achieving high productivity and high mechanical properties, and a method of forming the fiber-reinforced composite molded article.

In order to solve the above problems, the fiber-reinforced composite molded article of the present invention has the following configuration:

a fiber-reinforced composite molded article prepared by curing reinforcing fibers and a resin composition, the resin composition comprising an internal mold release agent, wherein the value obtained by normalizing a Poisson-corrected ion intensity derived from the internal mold release agent detected by the following measurement method on the surface of the fiber-reinforced composite molded article, by the Poisson-corrected gross positive secondary ion intensity detected in the same area, is higher than 0.1.

As the method of measuring the ion intensity, TOF-SIMS is used, and details of the measurement method are as follows.

[Measurement Method]

For a 300 μm-square area(s) on the surface of the molded article after mold release, positive secondary ion measurement is carried out using TOF-SIMS. As a primary ionic species, $Bi^{3++}$ is used, and the primary ion irradiation density is set to $2.55\ e^{+10}$ ions/cm$^2$. The ion intensity is calculated for the ionic species with the largest number among the detected ionic species that are thought to be derived from the internal mold release agent, wherein the calculation is carried out by performing Poisson correction for the obtained intensity.

[Normalization]

The ion intensity is divided by the gross positive secondary ion intensity calculated by performing Poisson correction for the gross positive secondary ion intensity detected in the same area.

The method of forming a fiber-reinforced composite molded article of the present invention has the following configuration:

a method of forming a fiber-reinforced composite molded article for obtaining the fiber-reinforced composite molded article described above, the method comprising heating at 30° C. to 200° C. during curing-molding of the molded article.

In the fiber-reinforced composite molded article in the present invention, the average intensity of Poisson-corrected ion intensities derived from the internal mold release agent detected in four 300 μm-square areas on the surface of the molded body is preferably 750,000 to 1,700,000.

Further, when each of the four 300 μm-square areas on the surface of the molded body is divided into 128×128 pixels, the number of pixels having ion intensity before Poisson correction of not more than 15 is preferably less than 25% of the total number of pixels in each of all four areas.

Further, when each of the four 300 μm-square areas on the surface of the molded body is divided into 128×128 pixels, the ion intensities before Poisson correction derived from the internal mold release agent detected from all pixels are preferably not less than 12.

In the fiber-reinforced composite molded article in the present invention, the amount of the internal mold release agent added is preferably 0.1 to 5 wt % with respect to the resin.

Further, the internal mold release agent is preferably a silicone mold release agent, especially preferably a silicone fluid, but the internal mold release agent is not limited thereto.

Further, the modified silicone fluid preferably comprises a modification group including any of amino, epoxy, carboxyl, thiol, carbinol, methacryl, and phenol.

Further, the resin composition is preferably a thermosetting resin composition, more preferably any of an epoxy resin, a vinyl ester resin, and a polyester resin.

Preferably, in the method of forming a fiber-reinforced composite molded article of the present invention, the molded article is formed by press molding, wherein a flow is allowed to occur such that the ratio of the area after the molding to the area before the molding is not more than 300%.

Preferably, in the method of forming a fiber-reinforced composite molded article of the present invention, a reinforcing-fiber laminate and a resin are press-molded using a mold in which a cavity and a resin inlet are formed, wherein the reinforcing-fiber laminate is placed in the cavity of the mold, and wherein, upon injection of the resin composition from the resin inlet provided in the mold into the cavity, the resin composition is stirred immediately before the beginning of the resin injection.

Thus, the fiber-reinforced resin molded article in the present invention can produce good mold releasability even in cases where the amount of the internal mold release agent added is small, so that a material that can be mold released without use of an external mold release agent can be provided. Since an index indicating the production of the mold releasability by addition of a small amount of the agent has been obtained, a molded article having excellent physical properties can be obtained, and, since the labor for removing the mold release agent before the subsequent step can be reduced, high productivity can be achieved.

BRIEF DESCRIPTION OF THE DRAWINGS

FIG. 3(a) is a measurement diagram for a sample whose ion intensity in the 300 μm-square area is low, and FIG. 3(b) is a measurement diagram for a sample whose ion intensity in the 300 μm-square area is low and unevenly distributed.

DETAILED DESCRIPTION OF THE INVENTION

Embodiments according to the present invention are described below with reference to diagrams.

Figure 2:
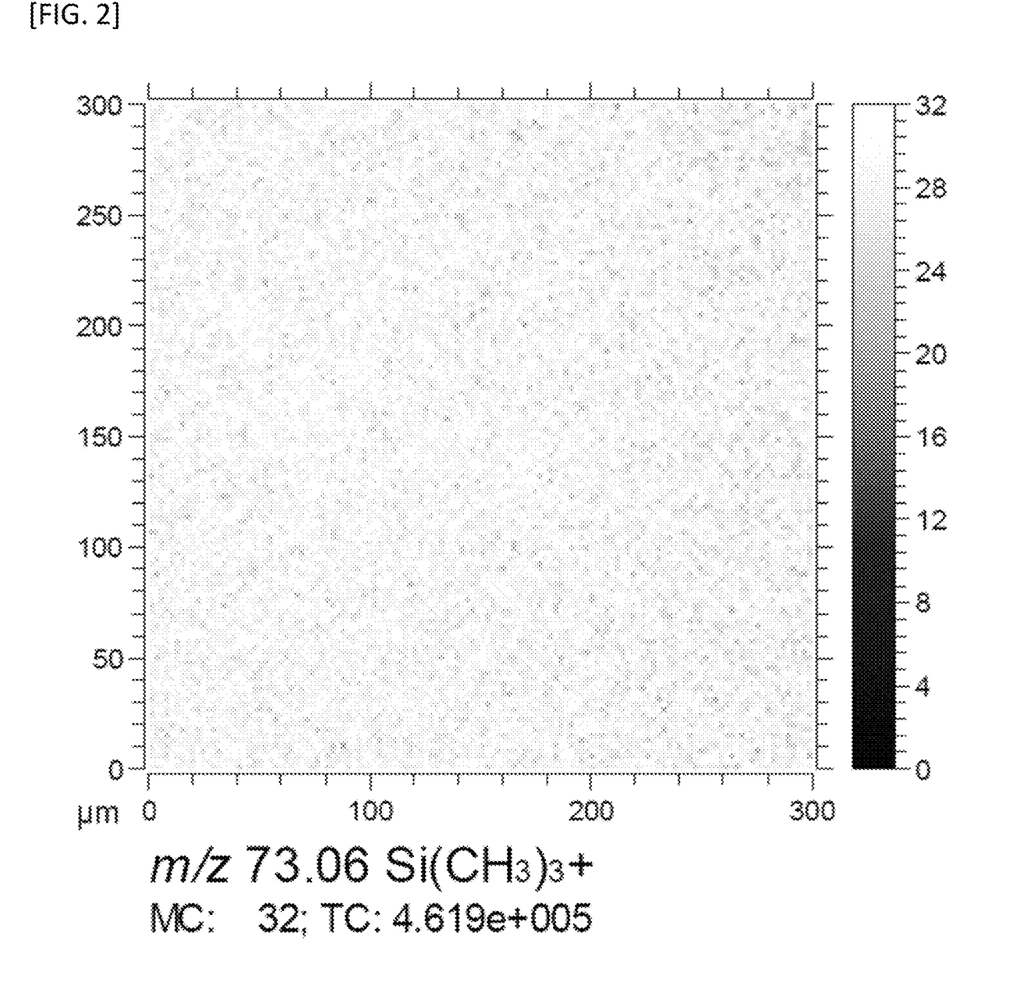
FIG. 2 is a TOF-SIMS measurement diagram that illustrates the distribution of the ion intensity derived from a mold release agent in a 300 μm-square area on the surface of a fiber-reinforced resin molded article that produces good mold releasability in the present invention.
Figure 3:
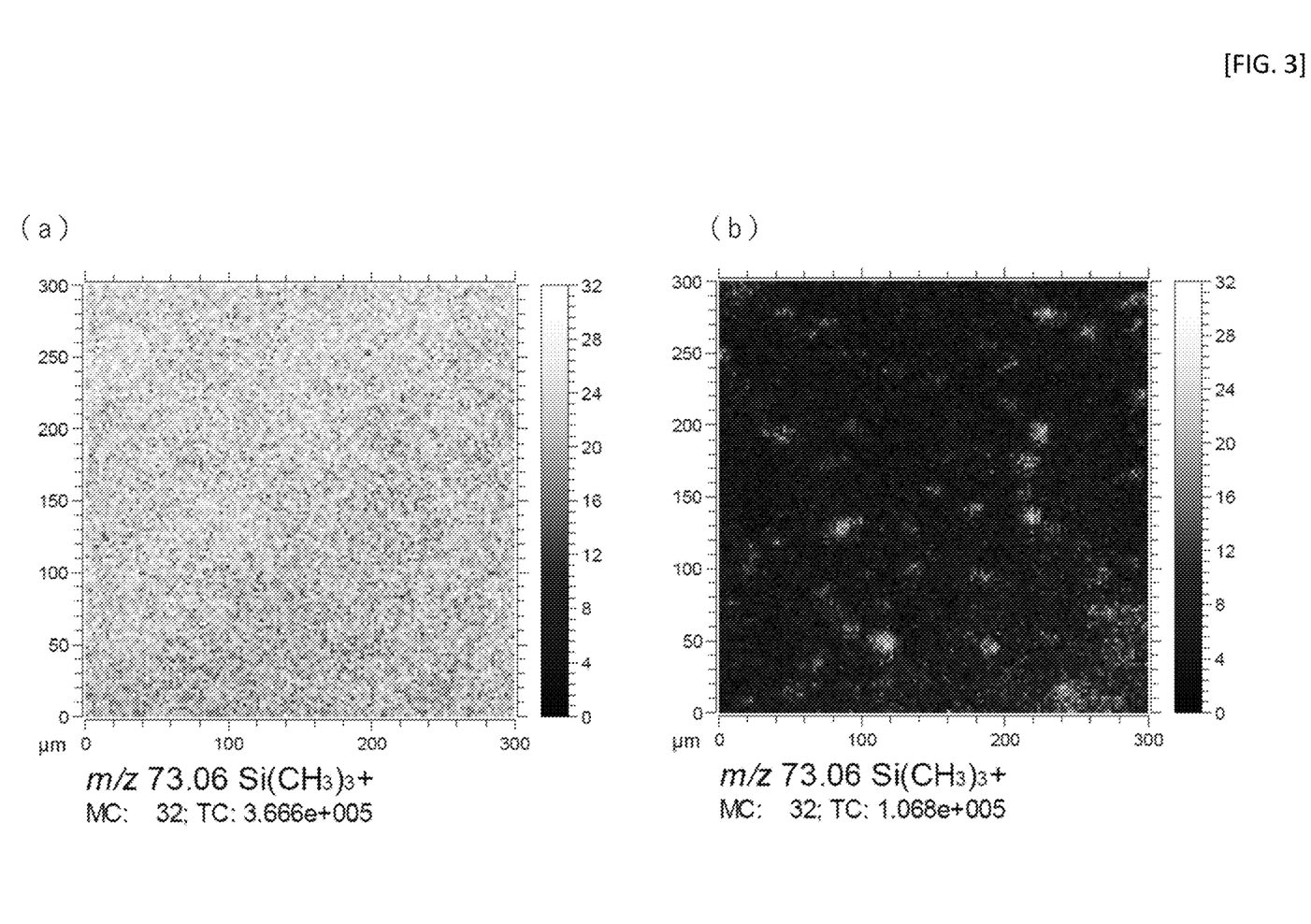
FIG. 3 shows TOF-SIMS measurement diagrams each of which illustrates the distribution of the ion intensity derived from a mold release agent in a 300 μm-square area on the surface of a fiber-reinforced resin molded article having poor mold releasability.

FIG. 2 is a TOF-SIMS measurement diagram that illustrates the distribution of the ion intensity derived from a mold release agent in a 300 μm-square area on the surface of a fiber-reinforced resin molded article in the present invention that produces good mold releasability. FIG. 3(a) is a measurement diagram for a sample whose ion intensity in a 300 μm-square area is low, and FIG. 3(b) is a measurement diagram for a sample whose ion intensity in a 300 μm-square area is low and unevenly distributed.

The fiber-reinforced composite molded article in the present invention is a fiber-reinforced composite molded article prepared by curing reinforcing fibers and a resin composition, the resin composition comprising an internal mold release agent, wherein the value obtained by normalizing a Poisson-corrected ion intensity derived from the internal mold release agent detected by the following measurement method on the surface of the fiber-reinforced composite molded article, by the Poisson-corrected gross positive secondary ion intensity detected in the same area (hereinafter referred to as normalized value), is higher than 0.1. This is because, when the normalized value is not more than 0.1, the ratio of other ions in the measurement area is large, indicating exposure of the surface of the matrix resin composition to the mold release surface, which results in occurrence of poor mold release. The normalized value is preferably not more than 0.25, more preferably not more than 0.22. In cases where the normalized value is not more than 0.25, there is no risk of deterioration of physical properties due to the addition of the mold release agent. In cases where the normalized value is not more than 0.22, the labor for removing the mold release agent on the surface of the molded article in a step after mold release can be reduced.

In the fiber-reinforced composite molded article in the present invention, the average intensity of Poisson-corrected ion intensities derived from the internal mold release agent detected in four 300 μm-square areas on the surface of the molded body is preferably 750,000 to 1,700,000. The average intensity of the ion intensities is more preferably 1,000,000 to 1,300,000. In cases where the ion intensity is not less than the preferred lower limit described above, the amount of the mold release agent present on the surface of the molded article is appropriate, so that poor mold release is unlikely to occur, and the burr-removing property is not deteriorated. On the other hand, in cases where the ion intensity is not more than the preferred upper limit described above, the labor for removal of the mold release agent on the surface of the molded article in a step after mold release can be reduced, and there is no risk of deterioration of transferability on the mold surface.

Further, when each of four 300 μm-square areas on the fiber-reinforced composite molded article in the present invention is divided into 128×128 pixels, the number of pixels whose ion intensity before Poisson correction is not more than 15 is preferably less than 25% of the total number of pixels in each of all four areas. In cases where the number of pixels whose ion intensity is not more than 15 is within the preferred range described above in each of all four areas, neither absolute insufficiency of the mold release agent on the surface of the molded article as shown in FIG. 3(a), nor deterioration of the mold releasability due to uneven distribution of the mold release agent as shown in FIG. 3(b), does not occur.

Further, in the fiber-reinforced composite molded article in the present invention, when each of four 300 μm-square areas is divided into 128×128 pixels, the ion intensities before Poisson correction derived from the internal mold release agent detected from all pixels are preferably not less than 12. In cases where the ion intensities before Poisson correction derived from the internal mold release agent are not less than 12, there is no surface area with insufficiency of mold releasability in the molded article, so that poor mold release can be avoided upon the molding.

[Resin Composition]

The resin composition contained in the fiber-reinforced composite material in the present invention is preferably a thermosetting resin composition, and the thermosetting resin composition is more preferably selected from epoxy resins, epoxy resins, unsaturated polyester resins, vinyl ester resins, diallyl phthalate resins, phenol resins, maleimide resins, cyanate resins, and the like. In particular, for obtaining a fiber-reinforced resin member having excellent mechanical properties, epoxy resins, vinyl ester resins, and polyester resins are still more preferred since they easily allow mixing of the thermosetting resin composition with the reinforcing fibers, and easily allow the molding. The material requiring the state where the mold releasability is produced in the present invention is more preferably an epoxy resin since it is highly adhesive. As the epoxy resin, a compound containing a plurality of epoxy groups in the molecule is used. Further, two or more kinds of different epoxy resins may be used in combination.

The curing agent used in the present invention may be either an amine-based curing agent or an acid anhydride-based curing agent.

As another component in the present invention, an isocyanate component may be used for increasing heat resistance. The isocyanate compound is not limited as long as each molecule has not less than two isocyanate groups in average. Known aliphatic isocyanates and aromatic isocyanates may be used. Polyisocyanate compounds and/or the like may be used individually or as a mixture of two or more thereof.

When these isocyanates are used, in cases where an internal mold release agent containing a reactive functional group is used, the isocyanates preferably have appropriate reactivity with the functional group. In particular, when an aromatic isocyanate is used, the amount of the internal mold release agent itself added or the functional group equivalent needs to be increased since aromatic isocyanates have higher reactivity than aliphatic isocyanates.

As another resin composition component in the present invention, a urea compound represented by Chemical Formula (I) may also be used.

(wherein $R^1$ and $R^2$ each independently represent H, $CH_3$, $OCH_3$, $OC_2H_5$, $NO_2$, a halogen, or $NH-CO-NR^3R^4$; and $R^3$ and $R^4$ each independently represent a $C_1$-$C_8$ hydrocarbon group, allyl, alkoxy, alkenyl aralkyl, or an alicyclic compound including $R^3$ and $R^4$ at the same time).

As another resin composition component in the present invention, a curing accelerator may also be used.

The resin composition may also contain another filler or additive depending on the required properties as long as the object of the present invention is not deteriorated. Examples of the filler or additive include inorganic fillers, flame retardants, conductivity-imparting agents, crystal nucleating agents, ultraviolet absorbents, antioxidants, damping agents, antimicrobial agents, insect repellents, deodorants, anticoloring agents, heat stabilizers, lubricants, antistatic agents, plasticizers, colorants, pigments, dyes, foaming agents, antifoaming agents, and coupling agents.

[Reinforcing Fibers]

The reinforcing fibers in the present invention are not limited. Carbon fibers, glass fibers, aramid fibers, and reinforcing fibers containing their mixture may be used. In particular, from the viewpoint of production of high mechanical properties and ease of designing the properties, the reinforcing fibers preferably contain carbon fibers. The form of the fibers may be appropriately selected, and may be in the form of continuous fibers, short fibers, or the like.

[Mold Release Agent]

Examples of the internal mold release agent added to the resin composition for the fiber-reinforced resin material in the present invention include metal soaps; plant waxes such as polyethylene waxes and carnauba waxes; fatty acid ester-based mold release agents; silicone-based mold release agents; animal waxes; and fluorine-based nonionic surfactants. The internal mold release agent is preferably a silicone-based mold release agent since it has excellent mold releasability. Among silicone mold release agents, silicone fluids can improve impregnation of the reinforcing fibers with the resin composition. In cases where the mold release agent is a solid during the impregnation into the reinforcing fibers, there may be the problem of unevenness caused by filtering out. In cases where the mold release agent is a liquid, such unevenness can be avoided, and moreover, in materials handled in a semi-cured state such as prepregs and sheet molding compounds, hardness of the semi-cured materials can be kept low, which is more preferred. The silicone fluid is especially preferably a reactive modified silicone fluid represented by the following General Formula (II) or (III), which is a polysiloxane containing a functional group R introduced to a side chain or a terminus (wherein m and n in Formula (II), and n in Formula (III) are integers of not less than 1).

In cases where such a functional group R is present, the functional group R reacts with the matrix resin in the matrix resin composition after the molding, to immobilize the mold release agent component in the matrix resin composition, so that bleed out of the mold release agent component on the surface of the molded article after the molding can be suppressed, and moreover, when a physical surface modification treatment method such as corona treatment or plasma treatment is carried out in the adhesion step for the molded article, the modification effect can be further enhanced. This is because of the following reason. Usually, modification of the surface layer improves adhesion between the modified mold release agent layer and the adhesive layer, but detachment still proceeds between the mold release agent layer and the matrix resin composition layer. In contrast, in cases where the mold release agent component is bound to the matrix resin composition through the functional group R, a detachment-suppressing effect is produced. Examples of such a functional group R include amino, epoxy, carboxyl, thiol, carbinol, methacryl, and phenol. The functional group R may be appropriately selected from these. In particular, since thiol or carboxyl modification exhibits lower reactivity with epoxy resins compared to amino or carbinol modification, thiol or carboxyl modification secures an amount of bleed that allows production of the mold releasability even when they are added in a small amount. Moreover, compared to ether or epoxy modification, thiol or carboxyl modification exhibits higher compatibility, resulting in better dispersion in the matrix resin composition. Thus, uniform bleeding on the surface of the molded article can be achieved, and good mold releasability can therefore be stably obtained. Regarding the modification site, side-chain modification is common as shown by Formula (II), but the modification site may be selected in accordance with the resin composition and the molding conditions. In cases where both-end modification is carried out as shown in General Formula (III), or where terminal modification is carried out, variation of the functional group equivalent is small, and hence the behavior in the matrix resin composition can be easily controlled. Therefore, variation of the degree of production of the mold releasability is also small.

The viscosity of the silicone fluid is preferably 10 $mm^2$/s to 10,000 $mm^2$/s from the viewpoint of ease of weighing upon the blending. In cases where the viscosity of the silicone fluid is not more than 5000 $mm^2$/s, the mold release agent can be easily microdispersed by stirring, and uniform bleeding of the mold release agent on the surface can be achieved, which is more preferred.

The reactive modified silicone fluid preferably has a functional group equivalent of 100 g/mol to 10,000 g/mol. In cases where the functional group equivalent is not less than 100 g/mol, the ratio of siloxane in the molecule is appropriate, so that the mold releasability can be produced. On the other hand, in cases where the functional group equivalent is not more than 10,000 g/mol, appropriate compatibility with the matrix resin composition can be achieved. Therefore, aggregation in the resin composition can be prevented, and uniform bleeding on the surface can be achieved. Moreover, the molded article can have an excellent external appearance and excellent mechanical properties.

The amount of the internal mold release agent added is preferably 0.1 to 5 wt % with respect to the resin composition. In cases where the resin composition is the thermosetting resin composition, the amount of the internal mold release agent is preferably 0.5 to 5 wt % with respect to the main agent component including the thermosetting resin composition as a major component. The main agent component is, for example, in cases of an epoxy resin, a component including a compound containing a plurality of epoxy groups in the molecule as a major component. For the main agent component, a single kind of, or a mixture of a plurality of kinds of, the resin compound may be used. In cases where a mixture of a plurality of kinds of the resin compound are used, the amount of the internal mold release agent added is preferably within the range described above with respect to the total amount of the main agent component from the viewpoint of allowing production of excellent mold releasability upon the molding. In cases where the amount of the internal mold release agent is within this preferred range, uniform bleed out of the mold release agent component on the surface of the molded article can be achieved during the molding of the resin composition for the fiber-reinforced resin material or in a step after the molding, resulting in excellent mold releasability. Moreover, since excessive bleed out on the surface of the molded article can be avoided, steps of adhesion, coating, and the like of the molded article are not disturbed. In cases where the resin composition to which the internal mold release agent is to be added is a two-liquid-based resin composition, the internal mold release agent may be added to either the main agent or the curing agent, or may be added after mixing of the main agent with the curing agent. The temperature at which the internal mold release agent is added is preferably lower than the temperature that allows the reaction between the mold release agent and the resin composition. At the same time, it is preferably a temperature that results in a viscosity at which mixing of the resin composition and the mold release agent by stirring is possible.

[Fiber-Reinforced Composite Molded Article]

In the fiber-reinforced composite molded article of the present invention, the volume ratio of the reinforcing fibers to the resin composition is preferably 10 to 90%. In cases where the volume ratio is not less than 10%, the molded article tolerates the load applied thereto upon mold releasing, so that the molded article is unlikely to be destroyed. In cases where the volume ratio is not more than 90%, the absolute amounts of the resin composition and the mold release agent present on the surface of the molded article are appropriately maintained to prevent poor mold release.

The molding temperature during curing-molding of the fiber-reinforced composite molded article of the present invention is preferably 30° C. to 200° C. In cases where the molding temperature is not less than 30° C., the curing reaction proceeds in a state where the viscosity of the resin composition during the molding is moderately low, so that bleed out of the mold release agent is promoted. In cases where the molding temperature is not more than 200° C., the molding time is not too short even in a fast-curing resin composition, so that bleed out of the mold release agent is promoted.

Preferably, the fiber-reinforced composite molded article of the present invention is formed by press molding, wherein a flow is allowed to occur such that the ratio of the lower-mold-side molded article surface area upon mold releasing, to the charge area upon injection of the fiber-reinforced resin composition into the mold, is not more than 300%. In high-cycle molding, reduction of the time of the treatment with the mold release agent is demanded, and press molding is often selected. In cases where the molding is carried out with a fluidity at which the area ratio described above is not more than 300%, uneven flows are unlikely to occur, and therefore unevenness of the resin composition and the mold release agent contained therein is unlikely to occur, so that poor mold release is unlikely to occur.

When the fiber-reinforced composite molded article of the present invention is obtained by a method in which the reinforcing-fiber laminate is placed in the cavity of the mold followed by injecting the resin composition from the resin inlet provided in the mold into the cavity, the resin composition is stirred immediately before the beginning of the injection. This is because, since the molding is carried out in a state where the internal mold release agent is sufficiently dispersed in the one-liquid or two-liquid resin composition containing the internal mold release agent, variation of the mold-releasability-producing effect is small.

Further, the fiber-reinforced composite molded article of the present invention can produce the effect even in cases where it is obtained from a material in which the control of the mold release agent in the resin composition is more difficult, such as a case where the molding is carried out through an intermediate base material, for example, a prepreg or a sheet molding compound. In cases where the molding is carried out based on such an intermediate base material, the length of time before the molding is preferably not longer than three months after the preparation of the uncured resin composition. This is because of the following reason. In a material required to be stored for a long time in a semi-cured state such as a prepreg or a sheet molding compound, aggregation of the mold release agent component in the matrix resin proceeds over time. Therefore, uniform bleeding of the component on the surface becomes more difficult as time passes. For securing better mold releasability, the length of time is preferably not longer than two months after the preparation.

[Method of Confirmation of Surface State of Ions Derived from Mold Release Agent]

The distribution state of the mold release agent on the surface of the fiber-reinforced composite molded article in the present invention is confirmed using TOF-SIMS (time-of-flight secondary ion mass spectrometry). For four 300 μm-square areas on the surface of the molded article after mold release, positive secondary ion measurement is carried out using $Bi^{3++}$ as a primary ionic species at a primary ion irradiation density of $2.55\ e^{+10}$ ions/cm². The ion intensity is calculated for the ionic species with the largest number among the detected ionic species that are thought to be derived from the internal mold release agent, wherein the calculation is carried out by performing Poisson correction for the obtained intensity.

The Poisson correction herein is carried out to supplement the ion intensity to be detected during the dead time in the TOF-SIMS. Therefore, the intensity after the correction is higher than that before the correction.

Normalization of the ion intensity is carried out by performing calculation by dividing the above value by the gross positive secondary ion intensity, which is the sum of all positive secondary ion intensities that have been similarly subjected to Poisson correction.

Further, the ion intensities derived from the internal mold release agent detected in four 300 μm-square areas on the surface of the molded article after mold release are shown in diagrams each divided into 128×128 pixels, and the number of pixels is counted for each detected intensity.

The four 300 μm-square areas on the surface of the molded article do not necessarily need to be adjacent to each other, and areas distant from each other may be arbitrarily selected.

Examples

The present invention is described below more concretely by way of Examples. For the sake of convenience in the analysis, the ion intensities and the distribution state on the surface of each molded article were measured using a resin plate containing no reinforcing fiber. In this process, the following results are thought to be the same as in the case where a fiber-reinforced composite molded article containing a reinforcing fiber is used. Further, a resin composition having the same composition as in the resin composition molded article subjected to the ion intensity measurement was used to form a fiber-reinforced composite molded article, and the mold release force was measured. The results are shown together in Tables 1 to 6. It should be noted that the present invention is not limited to these.

[Resin Materials]

In order to obtain the resin compositions of Examples and Comparative Examples, the following resin composition raw materials were used. In Table 1 to Table 6, the value of each component in the resin-composition lines represents the content, and the unit of the content is "part by mass" unless otherwise specified.

(A) Epoxy Resin

"EPOTOTO®" YD-128 (manufactured by Nippon Steel & Sumikin Chemical Co., Ltd.): bisphenol A resin "jER®" 154 (manufactured by Mitsubishi Chemical Corporation): phenol novolac epoxy resin (B) Curing Agent "jERCURE®" DICY7 (manufactured by Mitsubishi Chemical Corporation): dicyandiamide HN-5500 (manufactured by Hitachi Chemical Co., Ltd.): methyl-8-oxabicyclo[4.3.0]nonane-7,9-dione (C) Other Components (C-1) Isocyanate "Lupranate®" M20S (manufactured by BASF INOAC Polyurethane Co., Ltd.): polymeric MDI (polymethylene polyphenyl isocyanate), which has a structure containing a plurality of MDIs linked through methylene groups "Lupranate®" MI (manufactured by BASF INOAC Polyurethane Co., Ltd.): monomeric MDI (diphenylmethane diisocyanate)

(C-2) Urea Compound

"Omicure®" 24 (manufactured by PTI Japan Ltd.): 2,4-bis(3,3-dimethylureido)toluene (C-3) Accelerator Tetrabutylammonium bromide (manufactured by Tokyo Chemical Industry Co., Ltd.)

"CUREZOL®" 1,2 DMZ (manufactured by Shikoku Chemicals Corporation): 1,2-diimidazole (D) Mold Release Agent KF-2001 (manufactured by Shin-Etsu Silicone Co., Ltd.): thiol-modified silicone fluid X-22-3701E (manufactured by Shin-Etsu Silicone Co., Ltd.): carboxyl-modified silicone fluid KF-864 (manufactured by Shin-Etsu Silicone Co., Ltd.): amine-modified silicone fluid KF-96-1000CS (manufactured by Shin-Etsu Silicone Co., Ltd.): unmodified silicone fluid X-22-343 (manufactured by Shin-Etsu Silicone Co., Ltd.): epoxy-modified silicone fluid "DOWSIL®" L-7002 Fluid (manufactured by Dow Toray Co., Ltd.): ether-modified silicone fluid "DOWSIL®" BY 16-750 Fluid (manufactured by Dow Toray Co., Ltd.): carboxyl-modified silicone fluid (1) Preparation of Resin Compositions According to the blending ratios shown in Table 1 to Table 6, (A) to (D) were mixed together in an environment at normal temperature, to prepare the resin composition of Examples 1 to 12 and Comparative Examples 1 to 5. Further, in Examples 1 to 10 and Comparative Examples 1 to 5, the resin compositions were kept under an atmosphere at 40° C. for 24 hours.

(2) Curing-Molding

In each of Examples 1 to 10 and Comparative Examples 1 to 5, which are shown in Table 1, Table 2, Table 3, Table 5, and Table 6, the resin composition having increased viscosity after the preparation was charged into a mold whose thickness was adjusted to 2 mm using a "Teflon®" spacer having a thickness of 2 mm, such that the resin composition was sandwiched between release films ("Lumirror®" high smoothness grade). Press molding was carried out at 10 MPa at 140° C. for 5 minutes to obtain a resin composition cured plate. In each of Examples 11 and 12, which are shown in Table 4, the resin composition was injected to a mold whose thickness was similarly adjusted to 2 mm, such that the resin composition was sandwiched between release films ("Lumirror®" high smoothness grade). Curing was carried out at 140° C. for 2 hours to obtain a resin composition molded plate.

(3) Method of Detecting Ions Derived from Mold Release Agent on Surface of Resin Molded Article, by TOF-SIMS A small piece of each of the resin composition molded plates in Table 1 to Table 4 was held on a holder, and non-destructive surface layer analysis was carried out using a TOF-SIMS apparatus (TOF.SIMS 5, manufactured by ION-TOF GmbH). Regarding the measurement conditions, $Bi^{3++}$ was used as a primary ionic species, and the primary ion irradiation density was set to $2.55\ e^{+10}$ ions/cm$^2$.

(4) Evaluation of Mold Releasability (Preparation of Test Pieces)

Figure 1:
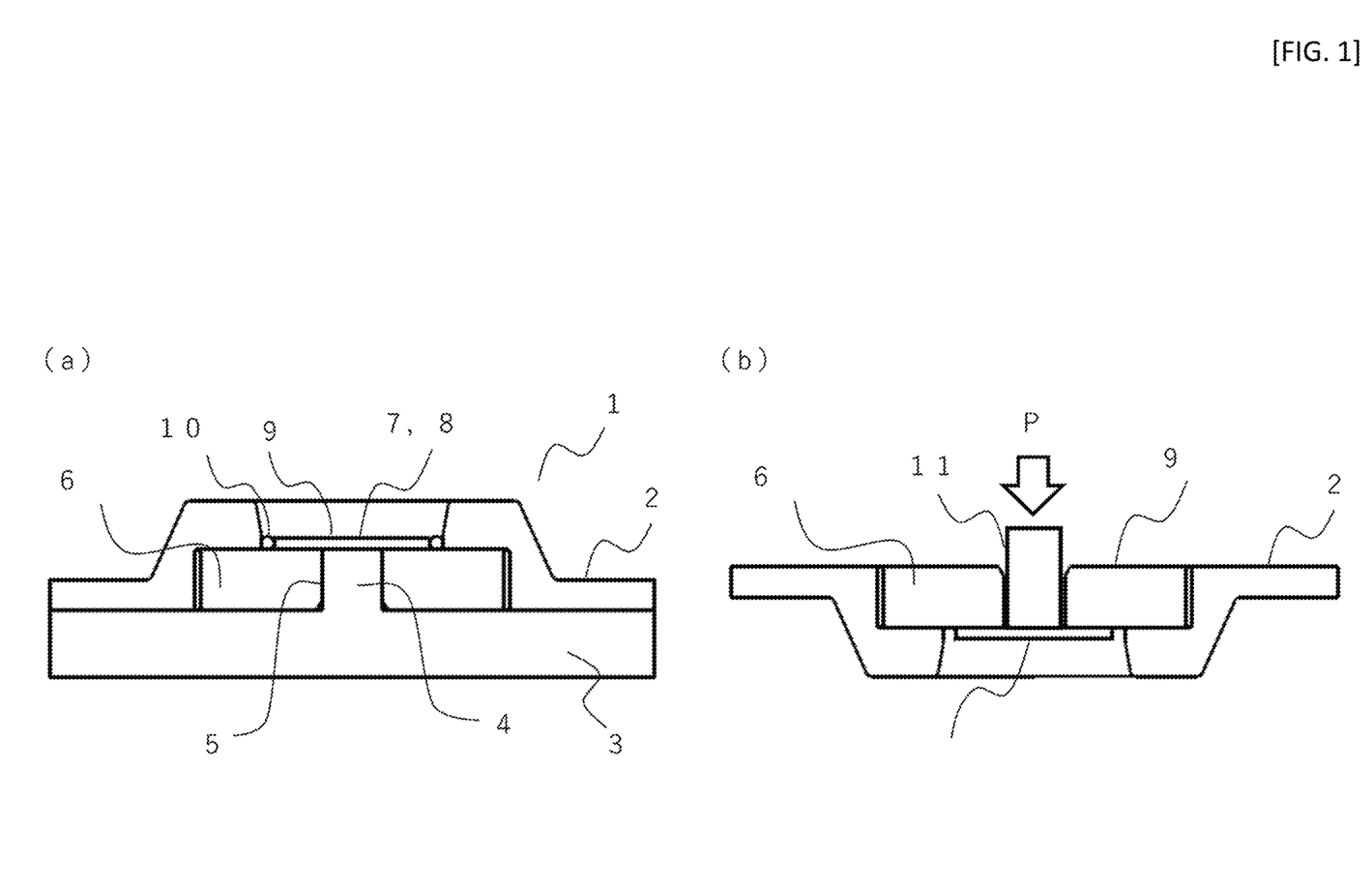
FIG. 1 is a schematic diagram illustrating a jig for evaluation of mold releasability of a resin composition formed in the present invention.

Using the resin compositions in Table 1 to Table 6, mold releasability was evaluated. For the evaluation of mold releasability, the measurement jig 1 illustrated in FIG. 1(*a*) was used. The measurement jig 1 has a circular shape in the planar view, and comprises an upper-side jig 2, and a lower-side jig 3 having a columnar protruding portion 4. A columnar metal piece 6 in which a columnar hole portion 5 that engages with the protruding portion 4 is formed, and the upper-side jig 2, were placed on the lower-side jig 3, and the upper-side jig 2 and the lower-side jig 3 were fastened. In Examples 1 to 10 and Comparative Examples 1 to 5, the thus constructed measurement jig 1 was preheated to about 140° C. A resin composition 7 was placed on the surface of the metal piece 6, and a pressure of about 10 MPa was applied thereto using a press machine to perform heat curing at about 140° C. for 5 minutes, to prepare an evaluation test piece 9 in which a cured product 8 of the resin composition is adhered to the metal piece. In Examples 11 and 12, the jig was preheated to 140° C., and a resin composition 7 was injected onto the metal piece 6 of the measurement jig 1. Heat curing was carried out in an oven at 140° C. for 2 hours, to similarly prepare an evaluation test piece 9 in which a cured product 8 of the resin composition is adhered to the metal piece. In the molding of the cured product 8 of the resin composition, for the purpose of reinforcement of the cured product of the resin composition during the measurement of the mold release force, a sheet (15 mm-square) of a carbon fiber fabric (manufactured by Toray Industries, Inc.; BT70-30) was placed on the metal piece 6 together with the resin composition 7. In the molding of the evaluation test piece 9, a silicone rubber band 10 was placed along the wall surface of the upper-side jig 2 in order to avoid overestimation of the mold release force due to adhesion of the cured product 8 of the resin composition to the upper-side jig 2.

(Test for Measurement of Mold Release Force)

As illustrated in FIG. 1(b), the mold releasability was evaluated as follows. After the molding of the cured product 8 of the resin composition, the lower-side jig 3 and the rubber band 10 were removed. In this state, into the hole portion 5 of the metal piece 6, a cylindrical body having the same diameter was inserted, and a load P was applied to the cylindrical body 11 such that the cured product 8 of the resin composition was detached from the metal piece 6. The maximum load during this operation was divided by the area of the cured product 8 of the resin composition, and the resulting value was regarded as the mold release force. Further, the fractures of the metal piece 6 and the cured product 8 of the resin composition after the test were visually observed, and the removing property for the burr remaining on the surface of the metal piece 6 was also evaluated. The measurement was carried out using an Electromechanical Universal Material Testing Machine Instron 5565 manufactured by Instron. The following criteria were used for the evaluation of the mold releasability. The fracture mode was as described in the parentheses.

Excellent: A mold release force of not more than 0.2 MPa.
Good: A mold release force of more than 0.2 MPa and not more than 0.3 MPa.
Fair: A mold release force of more than 0.3 MPa.
Poor: Destruction of the base material has proceeded, and mold release of the molded article does not occur at all.

The following criteria were used for the evaluation of the resin burr-removing property.

Excellent: The resulting burr can be removed simply by rubbing with waste cloth.
Good: The resulting burr can be removed by using a plastic scraper.
Fair: The resulting burr can be removed by using a metal scraper.
Poor: The resulting burr can be removed by polishing.

(Evaluation of Mold Release Agent Removal Property)

The mold release agent removal property was evaluated as follows for the mold released surface of the cured product 8 of the resin composition after mold release in each of Examples 1 to 12, which could be successfully mold released.

Excellent: Characters can be written using a water-based pen after degreasing with waste cloth impregnated with acetone.
Good: Characters can be written using a water-based pen after polishing once and then degreasing with waste cloth impregnated with acetone.
Fair: Characters can be written using a water-based pen after polishing once and then degreasing with waste cloth impregnated with a Si cleaner (HY1100 (manufactured by Toray Industries, Inc.)).
Poor: Evaluation is impossible since no sample could be obtained due to failure of mold release.

In Examples 1 to 6, different types and amounts of mold release agents were added to the resin composition 7. The normalized ion intensity was set within the range of 0.13 to 0.23; the ion intensity in 300 µm-squares was set within the range of 800,000 to 1,700,000; the ratio of pixels having ion intensity of not more than 15 was set to 0%; and the lowest ion intensity among all pixels was set to not less than 12. As a result of observation of the mold releasability in each condition, mold release was found to be possible in any of the conditions. In Examples 1 to 3, 5, and 6, the mold release force was low, and therefore destruction of the cured product of the resin composition was suppressed. Further, in particular, no resin burr occurred in Examples 1 and 5, and the samples other than Example 1 had especially excellent mold release agent removal properties.

In Examples 7 to 10, resin composition formulations different from those of Examples 1 to 6 were used. Without changing the mold release agent, the normalized ion intensity was set within the range of 0.14 to 0.18; the ion intensity in 300 µm-squares was set within the range of 750,000 to 1,600,000; the ratio of pixels having ion intensity of not more than 15 was set to 0%; and the lowest ion intensity among all pixels was set to not less than 11. As a result of observation of the mold releasability in each condition, mold release was found to be possible in any of the conditions. In Examples 7 to 9, the mold release force was low, and therefore destruction of the cured product of the resin composition was suppressed. The samples other than Example 7 also had especially excellent mold release agent removal properties.

In Examples 11 and 12, resin compositions different from those of Examples 1 to 10 were used, and a mold release agent was added in different amounts. The normalized ion intensity was set within the range of 0.17 to 0.26; the ion intensity in 300 µm-squares was set within the range of 1,600,000 to 2,000,000; the ratio of pixels having ion intensity of not more than 15 was set to 0%; and the lowest ion intensity among all pixels was set to not less than 17. As a result of observation of the mold releasability in each condition, mold release was found to be possible; adhesive failure was found to have proceeded; and no resin burr was found to have occurred; in any of the conditions. In Example 11, degreasing using waste cloth impregnated with acetone was necessary for removal of bled mold release agent.

In Comparative Examples 1 to 5, resin compositions used in Examples 1 to 10 were blended at the described blending ratios, and different types and amounts of mold release agents were added. The normalized ion intensity was set not more than 0.09; the ion intensity in 300µ squares was set within the range of 300,000 to 1,100,000; the ratio of pixels having ion intensity of not more than 15 was set to not less than 25%; and the lowest ion intensity among all pixels was set to less than 12. As a result of observation of the mold releasability in each condition, mold release was found to be impossible, and the resin burr-removing property was found to be poor in any of the conditions. Since the mold release was impossible, evaluation of the mold release agent removal property on the mold released surface could not be carried out.

TABLE 1

| | | | Example 1 | Example 2 | Example 3 | Example 4 |
|---|---|---|---|---|---|---|
| Epoxy Resin | Component (A) | YD128 | 60 | 60 | 60 | 60 |
| ※Unit of each value | | jER154 | 40 | 40 | 40 | 40 |
| is Parts by Mass | Component (B) | DICY | 6.5 | 6.5 | 6.5 | 6.5 |
| | Other | M20S | 6.5 | 6.5 | 6.5 | 6.5 |
| | Component (C) | Omicure24 | 3 | 3 | 3 | 3 |
| | | Tetrabutyl-ammonium Bromide | 3 | 3 | 3 | 3 |

TABLE 1-continued

|  |  | Example 1 | Example 2 | Example 3 | Example 4 |
|---|---|---|---|---|---|
| Internal Mold Release Agent Component (D) ※Unit of each value is Parts by Mass | KF-2001 | 4 | 1 | — | — |
|  | X-22-3701E | — | — | 4 | 1 |
| Results of TOF-SIMS Measurement | Normalized Ion Intensity | 0.23 | 0.18 | 0.19 | 0.16 |
|  | Ion Itensity in 300 μ-Squares | 1700000 | 1300000 | 1400000 | 800000 |
|  | Ratio of Pixels having Ion Intensity of not more than 15 (%) | 0 | 0 | 0 | 0 |
|  | Lowest Ion Intensity among All Pixels | 22 | 19 | 19 | 12 |
| Evaluation Results of Mold Releaseability | Mold Release Force (MPa) | 0.13 | 0.22 | 0.12 | 0.48 |
|  | Mold Releasability (Fracture Mode) | Good (Adhesive Failure) | Good (Adhesive Failure) | Good (Adhesive Failure) | Fair (Adhesive Failure + Partial Destruction of Cured Product) |
|  | Resin Burr Removing Property | Excellent (No Resin Burr) | Good | Good | Fair |
|  | Mold Release Agent Removal Property | Good | Excellent | Excellent | Excellent |

|  |  |  | Example 5 | Example 6 |
|---|---|---|---|---|
| Epoxy Resin ※Unit of value is Parts by Mass | Component (A) | YD128 | 60 | 60 |
|  |  | jER154 | 40 | 40 |
|  | Component (B) | DICY | 6.5 | 6.5 |
|  | Other | M20S | 6.5 | 6.5 |
|  | Component (C) | Omicure24 | 3 | 3 |
|  |  | Tetrabutyl-ammonium Bromide | 3 | 3 |
| Internal Mold Release Agent Component (F) ※Unit of each value is Parts by Mass | BY 16-750 |  | 4 | 1 |

-continued

|  |  | Example 5 | Example 6 |
|---|---|---|---|
| Results of TOF-SIMS Measurement | Normalized Ion Intensity | 0.15 | 0.13 |
|  | Ion Intensity in 300μ-Squares | 1300000 | 1200000 |
|  | Ratio of Pixels having Ion Intensity of not more than 15 (%) | 0 | 0 |
|  | Lowest Ion Intensity among All Pixels | 20 | 18 |
| Evaluation Results of Mold Releasability | Mold Release Force (MPa) | 0.11 | 0.2 |
|  | Mold Releasability (Fracture Mode) | Good (Adhesive Failure) | Good (Adhesive Failure) |
|  | Resin Burr Removing Property | Excellent (No Resin Burr) | Good |
|  | Mold Release Agent Removal Property | Good | Excellent |

TABLE 3

|  |  |  | Example 7 | Example 8 | Example 9 | Example 10 |
|---|---|---|---|---|---|---|
| Epoxy Resin ※Unit of each value is Parts by Mass | Component (A) | YD128 | 80 | 80 | 80 | 80 |
|  |  | jER154 | 20 | 20 | 20 | 20 |
|  | Component (B) | DICY | 6.4 | 6.4 | 6.4 | 6.4 |
|  | Other | MI | 8.7 | 8.7 | 8.7 | 8.7 |
|  | Component (C) | Omicure24 | 3 | 3 | 3 | 3 |
|  |  | Tetrabutyl-ammonium Bromide | 3 | 3 | 3 | 3 |
| Internal Mold Release Agent Component (D) ※Unit of each value is Parts by Mass | KF-2001 |  | 4 | 1 | — | — |
|  | X-22-3701E |  | — | — | 4 | 1 |
| Results of TOF-SIMS Measurement | Normalized Ion Intensity |  | 0.18 | 0.16 | 0.18 | 0.14 |
|  | Ion Itensity in 300 μ-Squares |  | 1600000 | 1100000 | 1200000 | 750000 |
|  | Ratio of Pixels having Ion Intensity of not more than 15 (%) |  | 0 | 0 | 0 | 0 |
|  | Lowest Ion Intensity among All Pixels |  | 21 | 17 | 18 | 11 |

TABLE 3-continued

|  |  | Example 7 | Example 8 | Example 9 | Example 10 |
|---|---|---|---|---|---|
| Evaluation Results of Mold Releaseability | Mold Release Force (MPa) | 0.15 | 0.26 | 0.14 | 0.49 |
|  | Mold Releasability (Fracture Mode) | Good (Adhesive Failure) | Good (Adhesive Failure) | Good (Adhesive Failure) | Fair (Adhesive Failure + Partial Destruction of Cured Product) |
|  | Resin Burr Removing Property | Good | Good | Good | Fair |
|  | Mold Release Agent Removal Property | Good | Excellent | Excellent | Excellent |

|  |  |  | Example 11 | Example 12 |
|---|---|---|---|---|
| Epoxy Resin ※Unit of each value is Parts by Mass | Component (A) | YD128 | 100 | 100 |
|  | Component (B) | HN-5500 | 100 | 100 |
|  | Other Component (C) | 1,2-DMZ | 5 | 5 |
| Internal Mold Release Agent Component (F) ※Unit of each value is Parts by Mass |  | KF-2001 | 4 | 1 |
| Results of TOF-SIMS Measurement Epoxy Resin | Normalized Ion Intensity |  | 0.26 | 0.17 |
|  | Ion Intensity in 300μ-Squares |  | 2000000 | 1600000 |
|  | Ratio of Pixels having Ion Intensity of not than 15 (%) |  | 0 | 0 |
|  | Lowest Ion Intensity among All Pixels |  | 20 | 17 |
| Evaluation Results of Mold Releasability | Mold Release Force (MPa) |  | 0.03 | 0.1 |
|  | Mold Releasability (Fracture Mode) |  | Good (Adhesive Failure) | Good (Adhesive Failure) |
|  | Resin Burr Removing Property |  | Excellent (No Resin Burr) | Excellent (No Resin Burr) |
|  | Mold Release Removal Property |  | Fair | Good |

|  |  |  | Comparative Example 5 |
|---|---|---|---|
| Epoxy Resin ※Unit of each value is Parts by Mass | Component (A) | YD128 | 80 |
|  |  | jER154 | 20 |
|  | Component (B) | DICY | 6.4 |
|  | Other Component (C) | M20S | — |
|  |  | MI | 8 |
|  |  | Omicure24 | 3 |
|  |  | Tetrabutyl-ammonium Bromide | 3 |
| Internal Mold Release Agent Component (F) ※Unit of each value is Parts by Mass |  | L-7002 | 4 |
| Results of TOF-SIMS Measurement | Normalized Ion Intensity |  | 0.08 |
|  | Ion Intensity in 300μ-Squares |  | 1000000 |
|  | Ratio of Pixels having Ion Intensity of not more than 15 (%) |  | 25 |
|  | Lowest Ion Intensity among All Pixels |  | 7 |

TABLE 5

|  |  |  | Comparative Example 1 | Comparative Example 2 | Comparative Example 3 | Comparative Example 4 |
|---|---|---|---|---|---|---|
| Epoxy Resin ※Unit of each value is Parts by Mass | Component (A) | YD128 | 60 | 60 | 80 | 80 |
|  |  | jER154 | 40 | 40 | 20 | 20 |
|  | Component (B) | DICY | 6.5 | 6.5 | 6.5 | 6.5 |
|  | Other | M20S | 6.5 | 6.5 | — | — |
|  | Component (C) | MI | — | — | 8 | 8 |
|  |  | Omicure24 | 3 | 3 | 3 | 3 |
|  |  | Tetrabutyl-ammonium Bromide | 3 | 3 | 3 | 3 |
| Internal Mold Release Agent Component (F) ※Unit of each value is Parts by Mass |  | KF-864 | 4 | 1 | — | — |
|  |  | KF-96-1000CS | — | — | 4 | — |
|  |  | X-22-343 | — | — | — | 4 |
| Results of TOF-SIMS Measurement | Normalized Ion Intensity |  | 0.06 | 0.03 | 0.09 | 0.08 |
|  | Ion Itensity in 300 μ-Squares |  | 740000 | 300000 | 1100000 | 1000000 |
|  | Ratio of Pixels having Ion Intensity of not more than 15 (%) |  | 27 | 100 | 25 | 25 |
|  | Lowest Ion Intensity among All Pixels |  | 3 | 0 | 7 | 6 |
| Evaluation Results of Mold Releaseability | Mold Release Force (MPa) |  | Failure of Mold Release | Failure of Mold Release | Failure of Mold Release | Failure of Mold Release |
|  | Mold Releasability (Fracture Mode) |  | Bad (Cured Resin Destruction) | Bad (Cured Resin Destruction) | Bad (Cured Resin Destruction) | Bad (Cured Resin Destruction) |
|  | Resin Burr Removing Property |  | Bad | Bad | Fair | Fair |

-continued

| | | Comparative Example 5 |
|---|---|---|
| Evaluation Results of Mold Releasability | Mold Release Force (MPa) | Failure of Mold Release |
| | Mold Releasability (Fracture Mode) | Bad (Cured Resin Destruction) |
| | Resin Burr Removing Property | Fair |

INDUSTRIAL APPLICABILITY

Since the resin molded article for the fiber-reinforced resin material of the present invention has good mold releasability for uses in aircrafts, uses in automobiles, uses in sports, and uses in other common operations, it can provide high productivity.

DESCRIPTION OF SYMBOLS

1. Measurement jig
2. Upper-side jig
3. Lower-side jig
4. Protruding portion
5. Hole portion
6. Metal piece
7. Resin composition
8. Cured product of resin composition
9. Test piece for evaluation of mold releasability
10. Silicone rubber band
11. Cylindrical body

The invention claimed is:

1. A fiber-reinforced composite molded article prepared by curing reinforcing fibers and a thermosetting resin composition, the resin composition comprising an internal mold release agent,
   wherein:
      the internal mold release agent is a silicone mold release agent,
      the silicone mold release agent is a silicone fluid having a functional group equivalent of 100 g/mol to 10,000 g/mol,
      the silicone fluid comprises a modification group including a carboxyl or a thiol,
      the thermosetting resin composition includes a bisphenol-A epoxy resin, and
   the value obtained by normalizing a Poisson-corrected ion intensity derived from the internal mold release agent detected in a predetermined area of a surface of the fiber-reinforced composite molded article, by the Poisson-corrected gross positive secondary ion intensity detected in the predetermined area, is higher than 0.1.

2. The fiber-reinforced composite molded article according to claim 1, wherein the predetermined area is four 300 μm-square areas on the surface of the molded body, and the average ion intensity of Poisson-corrected ion intensities derived from the internal mold release agent detected in the four 300 μm-square areas on the surface of the molded body is 750,000 to 1,700,000.

3. The fiber-reinforced composite molded article according to claim 1, wherein, when each of the four 300 μm-square areas on the surface of the molded body is divided into 128×128 pixels, the number of pixels having ion intensity before Poisson correction of not more than 15 is less than 25% of the total number of pixels in each of all areas.

4. The fiber-reinforced composite molded article according to claim 1, wherein, when each of the four 300 μm-square areas on the surface of the molded body is divided into 128×128 pixels, the ion intensities before Poisson correction derived from the internal mold release agent detected from all pixels are not less than 12.

5. The fiber-reinforced composite molded article according to claim 1, wherein the amount of the internal mold release agent added is 0.1 to 5 wt % with respect to the resin composition.

6. A method of forming a fiber-reinforced composite molded article for obtaining the fiber-reinforced composite molded article according to claim 1, the method comprising heating at 30° C. to 200° C. during curing-molding of the molded article.

7. The method of forming a fiber-reinforced composite molded article according to claim 6, comprising forming the molded article by press molding, wherein a flow is allowed to occur such that the ratio of the lower-mold-side molded article surface area upon mold releasing, to the charge area upon injection of the fiber-reinforced resin composition into the mold, is not more than 300%.

8. The method of forming a fiber-reinforced composite molded article according to claim 6, comprising press-molding a reinforcing-fiber laminate and a resin composition using a mold in which a cavity and a resin inlet are formed, wherein the reinforcing-fiber laminate is placed in the cavity, and wherein, upon injection of the resin composition from the resin inlet into the cavity, the resin composition is stirred immediately before the beginning of the resin injection.

* * * * *